United States Patent
Rose

(10) Patent No.: US 9,842,210 B2
(45) Date of Patent: Dec. 12, 2017

(54) UNIVERSAL EXTENSIBLE FIRMWARE INTERFACE MODULE IDENTIFICATION AND ANALYSIS

(71) Applicant: Raytheon Company, Waltham, MA (US)

(72) Inventor: Robert Allen Rose, Cedar Park, TX (US)

(73) Assignee: Raytheon Company, Waltham, MA (US)

(*) Notice: Subject to any disclaimer, the term of this patent is extended or adjusted under 35 U.S.C. 154(b) by 315 days.

(21) Appl. No.: 14/598,740

(22) Filed: Jan. 16, 2015

(65) Prior Publication Data
US 2015/0199517 A1    Jul. 16, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 21/56* | (2013.01) |

(52) U.S. Cl.
CPC ............ *G06F 21/57* (2013.01); *G06F 21/562* (2013.01); *G06F 21/575* (2013.01); *G06F 2221/033* (2013.01); *G06F 2221/034* (2013.01)

(58) Field of Classification Search
CPC ............................... G06F 21/57; G06F 21/572
See application file for complete search history.

(56) References Cited

U.S. PATENT DOCUMENTS

| | | | |
|---|---|---|---|
| 6,178,504 B1* | 1/2001 | Fieres ................... | G06F 21/602 713/151 |
| 9,244,679 B1* | 1/2016 | Arellano ................. | G06F 8/71 |

(Continued)

OTHER PUBLICATIONS

"Chapter 2—Overview", In: Unified Extensible Firmware Interface Specification, Version 2.4, © 2006-2013 Unified, Inc., (Jun. 2013), 17-46.

(Continued)

*Primary Examiner* — Carl Colin
*Assistant Examiner* — Quy Pham
(74) *Attorney, Agent, or Firm* — Schwegman Lundberg & Woessner, P.A.

(57) ABSTRACT

The present disclosure provides a network architecture and verification platform for analyzing the various modules of a Unified Extensible Firmware Interface (UEFI) firmware image. In one embodiment, the disclosed network architecture and verification platform obtains various UEFI firmware images, such as UEFI firmware image residing on a client device or a UEFI firmware image hosted by a hardware manufacturer. The network architecture and verification platform may then segregate the various UEFI firmware modules that make up the UEFI firmware image, and subject the modules to different types of analysis. By analyzing the UEFI firmware modules individually, the network architecture and verification platform builds a repository of Globally Unique Identifiers (GUIDs) referenced by a given UEFI firmware module, which may then be referenced in future analyses to determine whether any changes, and the extent of such changes, have been made to an updated version of the given UEFI firmware module.

20 Claims, 12 Drawing Sheets

(56) References Cited

U.S. PATENT DOCUMENTS

| | | | | |
|---|---|---|---|---|
| 2003/0188146 A1* | 10/2003 | Hale | ............... | G06F 9/30101 |
| | | | | 713/1 |
| 2003/0217255 A1* | 11/2003 | Wyatt | ............... | G06F 9/4411 |
| | | | | 713/100 |
| 2006/0174055 A1* | 8/2006 | Flynn | ............... | G06F 9/4406 |
| | | | | 711/100 |
| 2006/0235894 A1* | 10/2006 | Rasmussen | ....... | G06F 17/30115 |
| 2014/0380031 A1* | 12/2014 | Jones | ............... | G06F 21/572 |
| | | | | 713/2 |

OTHER PUBLICATIONS

"Chapter 20—EFI Byte Code Virtual Machine", In: Unified Extensible Firmware Interface Specification, Version 2.4, © 2006-2013 Unified, Inc., (Jun. 2013), 891-947.

* cited by examiner

UNIVERSAL EXTENSIBLE FIRMWARE INTERFACE MODULE IDENTIFICATION AND ANALYSIS

CROSS-REFERENCE TO RELATED APPLICATIONS

This application claims the benefit of priority of U.S. Pat. App. No. 61/928,125, titled "SYSTEMS AND METHODS FOR UNIFIED EXTENSIBLE FIRMWARE INTERFACE (UEFI)" and filed Jan. 16, 2014, the disclosure of which is hereby incorporated by reference in its entirety.

TECHNICAL FIELD

The present application relates generally to analyzing firmware conforming to the Universal Extensible Firmware Interface (UEFI) and, in particular, to systems and methods for assigning unique identifiers to identified modules of a UEFI firmware and subsequently assigning a security risk value to other UEFI firmware based on the assigned unique identifiers.

BACKGROUND

The Unified Extensible Firmware Interface (UEFI) is a specification that defines a software interface between an operating system and platform firmware. UEFI defines two types of services: boot services and runtime services. Boot services include text and graphical consoles on various devices, and bus, block and file services. Runtime services are still accessible while the operating system is running, and include services such as date, time and NVRAM access.

In addition, UEFI provides a way to store data, in particular non-volatile data that is shared between platform firmware and operating systems or UEFI applications. Variable namespaces are identified by Globally Unique Identifiers (GUIDs), and variables may be implemented as key/value pairs.

Furthermore, UEFI can run standalone UEFI applications, which can be developed and installed independently of a system manufacturer. UEFI applications reside as files on an EFI System Partition (ESP) and can be started directly by the UEFI firmware's boot manager, or by other UEFI applications. Examples of UEFI applications include operating system loaders (e.g., boot loaders), such as the Microsoft® Windows® Boot Manager. A boot loader starts a specific operating system and may provide a user interface for the selection of another UEFI application to run. Another example of a UEFI application is the UEFI shell.

However, while UEFI provides flexibility in allowing various different types of EFI applications to run, this flexibility also presents a vulnerability to a computer system. In particular, a malicious user may attempt to infiltrate a target computer system by replacing or modifying portions of a UEFI firmware, which would then allow the malicious user access to the target computer system at its lowest (e.g., hardware) levels.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIGS. 5A-5B illustrate graphical user interfaces for identifying specific portions of one or more UEFI firmware modules in accordance with an example embodiment.

DETAILED DESCRIPTION

Figure 1:
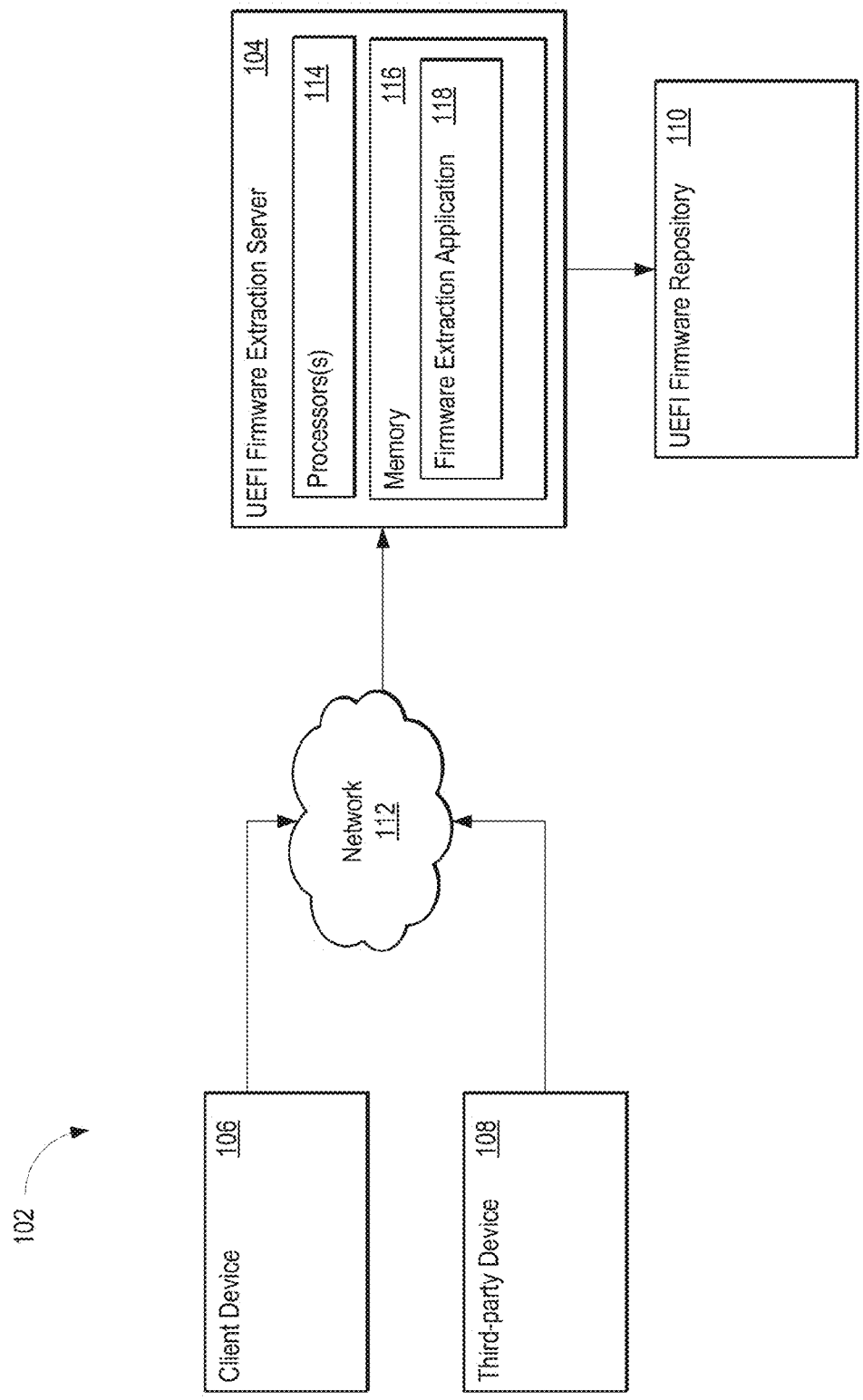
FIG. 1 illustrates an architecture diagram of a UEFI firmware extraction server in communication with a client device and a third-party device to obtain one or more UEFI firmware images in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides a network architecture and verification platform for analyzing the various modules of a UEFI firmware image. In one embodiment, the disclosed network architecture and verification platform obtains various UEFI firmware images, such as UEFI firmware image residing on a client device or a UEFI firmware image hosted by a hardware manufacturer (e.g., a motherboard manufacturer). The network architecture and verification platform may then segregate the various UEFI firmware modules that make up the UEFI firmware image, and subject the modules to different types of analysis. By analyzing the UEFI firmware modules individually, the network architecture and verification platform builds a repository of GUIDs referenced by a given UEFI firmware module, which may then be referenced in future analyses to determine whether any changes, and the extent of such changes, have been made to an updated version of the given UEFI firmware module.

Further still, the network architecture and verification platform may assign a unique fingerprint and security risk value to the given UEFI firmware module. In this implementation, when a different UEFI firmware image is obtained, the obtained UEFI firmware image can be assigned a security risk value based on the unique fingerprints of the UEFI firmware modules that make up the obtained UEFI firmware image. In assigning the security risk value, the network architecture and verification platform may generate an analysis report of a given UEFI module, such as referenced GUIDs, memory addresses that the UEFI module references, operations that invoke a GUID, and other such variables and operations, and a moderator may assign the security risk value after reviewing the analysis report. The technical benefit to this approach is that the network architecture and verification platform can quickly assign a security risk value to a given UEFI firmware image based on the unique fingerprints of the UEFI firmware modules that make up the UEFI firmware image.

In one embodiment, this disclosure provides for a method that includes extracting, with one or more processors, a Universal Extensible Firmware Interface (UEFI) firmware image file from a client device, and identifying, with the one or more processors, a first plurality of modules comprising the UEFI firmware image. The method also includes separating, with the one or more processors, the first plurality of modules into individual module files and scanning, with the one or more processors, a module selected from the first plurality of module files to identify a plurality of Globally Unique Identifiers (GUIDs). The method further includes determining, with the one or more processors, whether a GUID selected from the plurality of identified GUIDs is an unknown GUID by comparing the selected GUID with a plurality of previously identified GUIDs stored in a repository of known GUIDs, generating, with the one or more processors, an analysis report indicating whether one or more of the plurality of identified GUIDs is an unknown GUID, and generating, with the one or more processors, a unique identifier corresponding to the module selected from the first plurality of module files.

In another embodiment of the method, the method includes obtaining another UEFI firmware image file for use with the client device, identifying a second plurality of modules comprising the another UEFI firmware image file, comparing the module selected from the first plurality of modules with a corresponding module selected from the second plurality of modules, and identifying any differences between the module selected from the first plurality of modules and the corresponding module selected from the second plurality of modules.

In a further embodiment of the method, the differences comprise differences in the GUIDs referenced by the module selected from the first plurality of modules and the GUIDs referenced by the corresponding module selected from the second plurality of modules.

In yet another embodiment of the method, the differences comprise a difference in a first memory addresses referenced by the module selected from the first plurality of modules for a given GUID and a second memory addresses referenced by the corresponding module selected from the second plurality of modules for the same GUID.

In yet a further embodiment of the method, the UEFI firmware image file is assigned a security risk value based on the unique identifier corresponding to the selected module.

In another embodiment of the method, the method includes obtaining another UEFI firmware image file for use with the client device, identifying a second plurality of modules comprising the another UEFI firmware image file, the second plurality of modules including the module selected from the first plurality of module files, determining that the unique identifier previously generated for the module selected from the first plurality of module files still applies to the module included in the second plurality of modules, and assigning a security risk value to the another UEFI firmware image file based on the unique identifier.

In a further embodiment of the method, the method includes generating assembly language code corresponding to the module selected from the first plurality of modules, and replacing at least one portion of the assembly language code based on the previously identified GUIDs stored in the repository of known GUIDs.

This disclosure also describes a system that includes a computer-readable memory storing computer-executable instructions, and one or more processors in communication with the computer-readable memory that, having executed the computer-executable instructions, are configured to extract a Universal Extensible Firmware Interface (UEFI) firmware image file from a client device, and identify a first plurality of modules comprising the UEFI firmware image. The one or more processors are also configured to separate the first plurality of modules into individual module files and scan a module selected from the first plurality of module files to identify a plurality of Globally Unique Identifiers (GUIDs). The one or more processors are further configured to determine whether a GUID selected from the plurality of identified GUIDs is an unknown GUID by comparing the selected GUID with a plurality of previously identified GUIDs stored in a repository of known GUIDs and generate an analysis report indicating whether one or more of the plurality of identified GUIDs is an unknown GUID. Finally, the one or more processors are configured to generate a unique identifier corresponding to the module selected from the first plurality of module files.

In another embodiment of the system, the one or more processors are further configured to obtain another UEFI firmware image file for use with the client device, identify a second plurality of modules comprising the another UEFI firmware image file, compare the module selected from the first plurality of modules with a corresponding module selected from the second plurality of modules, and identify any differences between the module selected from the first plurality of modules and the corresponding module selected from the second plurality of modules.

In a further embodiment of the system, the differences comprise differences in the GUIDs referenced by the module selected from the first plurality of modules and the GUIDs referenced by the corresponding module selected from the second plurality of modules.

In yet another embodiment of the system, the differences comprise a difference in a first memory addresses referenced by the module selected from the first plurality of modules for a given GUID and a second memory addresses referenced by the corresponding module selected from the second plurality of modules for the same GUID.

In yet a further embodiment of the system, the UEFI firmware image file is assigned a security risk value based on the unique identifier corresponding to the selected module.

In another embodiment of the system, the one or more processors are further configured to obtain another UEFI firmware image file for use with the client device, identify a second plurality of modules comprising the another UEFI firmware image file, the second plurality of modules including the module selected from the first plurality of module files, determine that the unique identifier previously generated for the module selected from the first plurality of module files still applies to the module included in the second plurality of modules, and assign a security risk value to the another UEFI firmware image file based on the unique identifier.

In a further embodiment of the system, the one or more processors are further configured to generate assembly language code corresponding to the module selected from the first plurality of modules, and replace at least one portion of the assembly language code based on the previously identified GUIDs stored in the repository of known GUIDs.

This disclosure also provides for a computer-readable medium storing computer-executable instructions that, when executed by one or more processors, cause the one or more processors to perform a method, the method including extracting, with one or more processors, a Universal Extensible Firmware Interface (UEFI) firmware image file from a client device and identifying, with the one or more processors, a first plurality of modules comprising the UEFI firmware image. The method further includes separating, with the one or more processors, the first plurality of modules into individual module files, and scanning, with the one or more processors, a module selected from the first plurality of module files to identify a plurality of Globally Unique Identifiers (GUIDs). The method also includes determining, with the one or more processors, whether a GUID selected from the plurality of identified GUIDs is an unknown GUID by comparing the selected GUID with a plurality of previously identified GUIDs stored in a repository of known GUIDs and generating, with the one or more processors, an analysis report indicating whether one or more of the plurality of identified GUIDs is an unknown GUID. Finally, the method includes generating, with the one or more processors, a unique identifier corresponding to the module selected from the first plurality of module files.

In another embodiment of the computer-readable medium, the method includes obtaining another UEFI firmware image file for use with the client device, identifying a second plurality of modules comprising the another UEFI firmware image file, comparing the module selected from the first plurality of modules with a corresponding module selected from the second plurality of modules, and identifying any differences between the module selected from the first plurality of modules and the corresponding module selected from the second plurality of modules.

In a further embodiment of the computer-readable medium, the differences comprise differences in the GUIDs referenced by the module selected from the first plurality of modules and the GUIDs referenced by the corresponding module selected from the second plurality of modules.

In yet another embodiment of the computer-readable medium, the differences comprise a difference in a first memory addresses referenced by the module selected from the first plurality of modules for a given GUID and a second memory addresses referenced by the corresponding module selected from the second plurality of modules for the same GUID.

In yet a further embodiment of computer-readable medium, the UEFI firmware image file is assigned a security risk value based on the unique identifier corresponding to the selected module.

In another embodiment of the computer-readable medium, the method further comprises obtaining another UEFI firmware image file for use with the client device, identifying a second plurality of modules comprising the another UEFI firmware image file, the second plurality of modules including the module selected from the first plurality of module files, determining that the unique identifier previously generated for the module selected from the first plurality of module files still applies to the module included in the second plurality of modules, and assigning a security risk value to the another UEFI firmware image file based on the unique identifier.

The methods or embodiments disclosed herein may be implemented as a computer system having one or more specially-configured modules (e.g., hardware modules or software modules). Such modules may be executed by one or more processors of a computer system. The methods or embodiments disclosed herein may be embodied as instructions stored on a machine-readable medium that, when executed by one or more processors, cause the one or more processors to execute the instructions.

FIG. 1 illustrates an architecture diagram of a UEFI firmware verification platform 102 that includes a UEFI firmware extraction server 104 in communication with a client device 106 and a third-party device 108 to obtain one or more UEFI firmware images in accordance with an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the UEFI firmware verification platform 102 to facilitate additional functionality that is not specifically described herein.

While the UEFI firmware verification platform 102 shown in FIG. 1 employs a client-server architecture, the disclosed subject matter is, of course, not limited to such an architecture, and could equally well find application in other architectures, such as an event-driven, distributed, or peer-to-peer architecture system. Further, the various functional components of the UEFI firmware verification platform 102 may be implemented as standalone systems or software programs, which do not necessarily have networking capabilities. Moreover, it shall be appreciated that although the various functional components of the UEFI firmware verification platform 102 are discussed in the singular sense, multiple instances of one or more of the various functional components may be employed.

As shown, the UEFI firmware verification platform 102 includes a UEFI firmware extraction server 104 in communication with a client device 106 and a third-party device 108 by way of a network 112. The UEFI firmware extraction server 104 is also in communication with a UEFI firmware repository 110.

The client device 106, third-party device 108, UEFI firmware extraction server 104, and the UEFI firmware repository 110 may be communicatively coupled using a variety of different mechanisms. For example, in some instances, the client device 106 and the third-party device 108 communicate with the UEFI firmware extraction server 104 via the network 112, which may implement one or more wireless connections, such as a Wi-Fi connection (e.g., 802.6a/b/g/n), a Worldwide Interoperability for Microwave Access (WiMAX) connection, Bluetooth®, another type of wireless data connection, or combinations thereof. Accordingly, the network 112 may include one or more wireless access points coupled to a local area network (LAN), a wide area network (WAN), such as the Internet, or other packet-switched or circuit-switched data network. In other instances, the connections to the network 112 may be a wired connection, such as an Ethernet link, and the network 112 may be a LAN, a WAN, the Internet, or other packet-switched or circuit-switched data network.

Similarly, the UEFI firmware extraction server 104 is communicatively coupled to the UEFI firmware repository 110, which may include one or more wireless connections, one or more wired connections, or combinations thereof. Furthermore, the communication connections among the UEFI firmware extraction server 104, the client device 106, the third-party device 108, and the UEFI firmware repository 110 may also include other types of communication connections, such as communications using a Universal Serial Bus (USB) connection, an eSATA connection, a Thunderbolt™ connection, or a combination of such connections.

The client device 106 is configured to store and use a UEFI firmware image. For example, the client device 106 may include a computer motherboard, which may have non-volatile memory in which the UEFI firmware image resides. Examples of the client device 106 include a desktop computer, a laptop computer, a tablet computer, a server computer, or any other such device or combination of devices configured to store and execute a UEFI firmware image. The UEFI firmware residing on the client device 106 may include a variety of UEFI modules, such as device drivers, boot loaders, cryptographic service applications, and other such UEFI modules.

The third-party device 108 is configured to store and provide UEFI firmware images to requesting devices. For example, the third-party device 108 may be an Internet server having a File Transfer Protocol (FTP) or Hypertext Markup Language (HTML) interface that allows a requesting device to request one or more UEFI firmware images. The third-party device 108 may be the file server for a computer motherboard manufacturer, and the file server may store one or more versions of various UEFI firmware images for the computer motherboards made by the manufacturer. Additionally or alternatively, the third-party device 108 may be a file server operated by a user, and the UEFI firmware images provided by the user may be UEFI firmware images that the user has modified. This may include such scenarios where the user has added or modified the functionality of the original UEFI firmware image provided by a motherboard manufacturer, and the user desires to share such additions or modifications with other users. Of course, obtaining modified UEFI firmware images from users (e.g., not the manufacturer) carries an inherent risk and, as discussed below, the verification platform 102 is configured to reduce the risk of obtaining a UEFI firmware image in this way.

The UEFI firmware extraction server 104 is configured to obtain a UEFI firmware image from the client device 106 (such as the UEFI firmware image used to operate the client device 106) and one or more UEFI firmware images provided by the third-party device 108. In one embodiment, the UEFI firmware extraction server 104 includes one or more processors 114 and a memory 116. The memory 116 may include a firmware extraction application 118 configured to extract one or more UEFI firmware images from the client device 106, the third-party device 108, or combinations thereof.

The processors 114 may include one or more central processing units (CPUs), graphic processing units (GPUs), or combinations thereof. Furthermore, the processors 114 may include processors operating within a single device (e.g., a server) or one or more processors operating in a distributed computing environment. Examples of processors include those that are commercially available from such manufacturers as Intel and AMD.

The memory 116 may include one or more computer-readable storage mediums configured to store computer-executable instructions and/or data. Examples of the memory 116 include, and is not limited to, random-access memory (RAM), read-only memory (ROM), buffer memory, flash memory, and cache memory. While the memory 116 shown in FIG. 1 is illustrated as a single box, the term "computer-readable medium" should be taken to include a single medium or multiple media (e.g., a centralized or distributed database, or associated caches and servers) able to store instructions and/or data. The term "computer-readable medium" specifically excludes non-statutory signals per se.

Furthermore, the memory 116 is non-transitory (in other words, not having any transitory signals) in that it does not embody a propagating signal. However, labeling the memory 116 as "non-transitory" should not be construed to mean that the memory 116 is incapable of movement; the memory 116 should be considered as being transportable from one physical location to another. Additionally, since the memory 116 is tangible, the memory 116 may be considered to be a computer-readable device.

As mentioned above, the firmware extraction application 118 is configured to extract the UEFI firmware image from the client device 106 and the one or more UEFI firmware images provided by the third-party device 108. An example of a firmware extraction application is the AMI Firmware Update utility available from American Megatrends®, which may be used to extract the UEFI firmware image residing on the client device 106. The UEFI firmware extraction server 104 may then transfer the extracted UEFI firmware image from the client device 106 to the UEFI firmware repository 110. Accordingly, in one embodiment, the firmware extraction application 118 is locally executed by the UEFI firmware extraction server 104; in an alternative embodiment, the client device 106 may locally execute the firmware extraction application 118. Regardless of implementation, the extracted UEFI firmware image is transferred from the client device 106 to the UEFI firmware repository 110.

Another example of a firmware extraction application 118 includes a web browser, such as Microsoft® Internet Explorer® or Apple® Safari®, which may use FTP or the HyperText Transfer Protocol (HTTP), to download one or more UEFI firmware images from the third-party device 108 and transfer such obtained images to the UEFI firmware repository 110.

Accordingly, the UEFI firmware repository 110 includes one or more UEFI firmware images obtained and/or extracted by the UEFI firmware extraction server 104. The UEFI firmware repository 110 may include one or more relational databases, hierarchical databases, flat files, or combinations thereof, for storing one or more UEFI firmware images. As discussed below, the UEFI firmware repository 110 may be accessible by other servers and/or devices of the verification platform 102 such that the UEFI firmware images are available to these other servers and/or devices.

Figure 2:
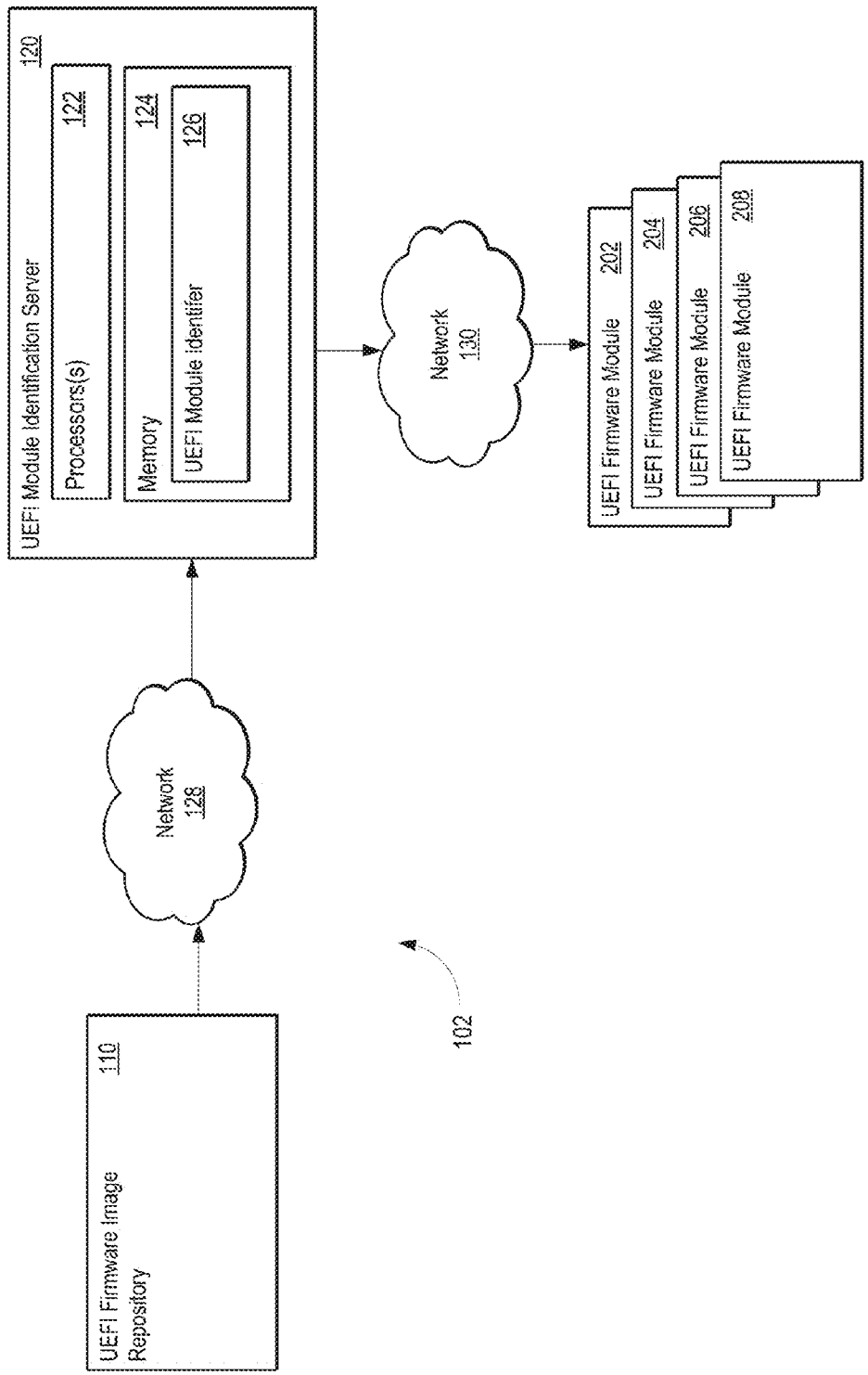
FIG. 2 illustrates a block diagram of a UEFI module identification server separating the modules of a selected UEFI firmware image in accordance with an example embodiment.

After obtaining the UEFI firmware images, the verification platform 102 may separate out the modules that make up the various UEFI firmware images. As shown in FIG. 2, the verification platform 102 may further include a UEFI module identification server 120 configured to separate the modules of an UEFI firmware image selected from the UEFI firmware image repository 110. Separating the modules from a selected UEFI firmware image results in the obtained UEFI firmware modules 202-208, which may be stored locally on the UEFI module identification server 120 or remotely via a network 130.

In one embodiment, the UEFI module identification server 120 includes one or more processors 122 and a memory 124. The processors 122 may include one or more central processing units (CPUs), graphic processing units (GPUs), or combinations thereof. Furthermore, the processors 122 may include processors operating within a single device (e.g., a server) or one or more processors operating in a distributed computing environment. Examples of processors include those that are commercially available from such manufacturers as Intel and AMD.

The memory 124 may include one or more computer-readable storage mediums configured to store computer-executable instructions and/or data. Examples of the memory 124 include, and is not limited to, random-access memory (RAM), read-only memory (ROM), buffer memory, flash memory, and cache memory. While the memory 124 shown in FIG. 2 is illustrated as a single box, the memory 124 may include a single device or multiple devices (e.g., multiple memories and/or distributed memories).

Furthermore, the memory 124 is non-transitory (in other words, not having any transitory signals) in that it does not embody a propagating signal. However, labeling the memory 124 as "non-transitory" should not be construed to mean that the memory 124 is incapable of movement; the memory 214 should be considered as being transportable from one physical location to another. Additionally, since the memory 124 is tangible, the memory 124 may be considered a computer-readable device.

The memory 124 may store a UEFI module identifier 126 executable by the one or more processors 122. The UEFI module identifier 126 is configured to identify the various modules of a UEFI firmware image selected from the UEFI firmware image repository 110. As one example, the UEFI module identifier 126 may be the utility UEFITool, which is available from the GitHub repository accessible via the Internet. As another example, the UEFI module identifier 126 may be the utility MMTool, which is available from American Megatrends®.

After processing a selected UEFI firmware image, the UEFI module identification server 120 obtains the various UEFI firmware modules 202-208 that make up the UEFI firmware image. The UEFI firmware modules 202-208 may include such modules as memory device drivers, graphic device drivers, cryptographic service applications, boot loaders, networking device drivers, and other such UEFI firmware modules. The UEFI module identification server 120 may store the UEFI firmware modules 202-208 locally, such as in memory 124, or remotely via the network 130. Accordingly, the network 130 may include one or more wireless networks, wired networks, or combinations thereof. Furthermore, the network 130 may include other data communications means such as a USB connection, an eSATA connection, a Thunderbolt™ connection, or other such data communication means.

Figure 3:
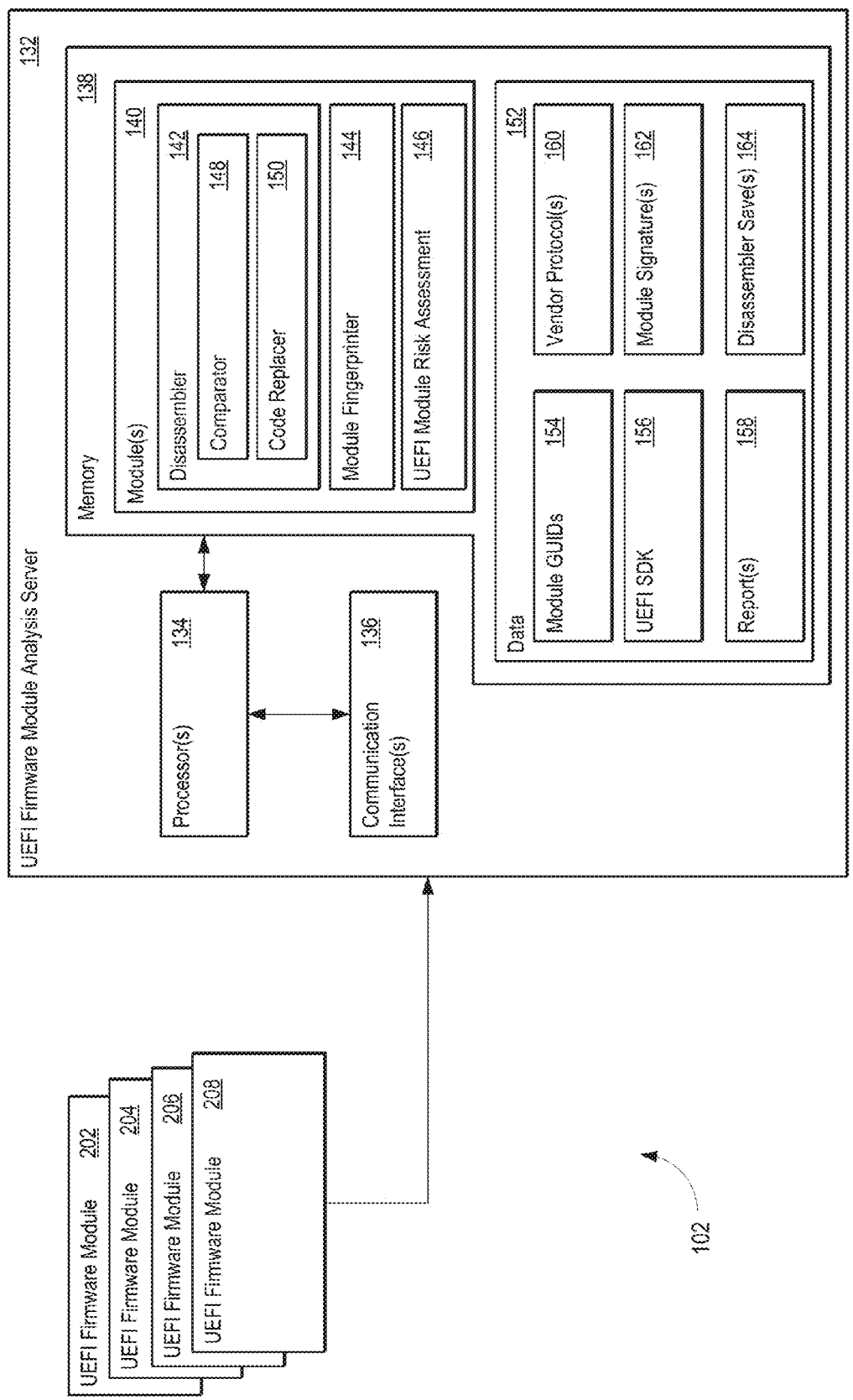
FIG. 3 illustrates a block diagram of a UEFI firmware module analysis server in accordance with an example embodiment.

Having obtained the UEFI firmware modules 202-208, the verification platform 102 then determines the GUIDs referenced by the various modules 202-208 and the security risk presented by each of the modules 202-208. Accordingly, the verification platform 102 includes a UEFI firmware module analysis server 132. FIG. 3 illustrates a block diagram of the UEFI firmware module analysis server 132 in accordance with an example embodiment. The UEFI firmware module analysis server 132 includes one or more processors 134, one or more communication interfaces 136 and a memory 138. The UEFI firmware module analysis server 132 may process each of the UEFI firmware modules 202-208 and may retrieve them from a repository located on a network in communication with the UEFI firmware module analysis server 132 or may receive them from the UEFI module identification server 120.

The processors 134 may include one or more central processing units (CPUs), graphic processing units (GPUs), or combinations thereof. Furthermore, the processors 134 may include processors operating within a single device (e.g., a server) or one or more processors operating in a distributed computing environment. Examples of processors include those that are commercially available from such manufacturers as Intel and AMD.

The communication interface 136 may include one or more communication interfaces configured to send and/or receive data. Examples of communication interfaces include networking interfaces (e.g., wireless and/or wired interfaces), data transmission interfaces (e.g., USB, eSATA, etc.), and other such communication interfaces.

The memory 138 may include one or more computer-readable storage mediums configured to store computer-executable instructions and/or data. Examples of the memory 138 include, and is not limited to, random-access memory (RAM), read-only memory (ROM), buffer memory, flash memory, and cache memory. While the memory 138 shown in FIG. 3 is illustrated as a single box, the memory 138 may include a single device or multiple devices (e.g., multiple memories and/or distributed memories).

Furthermore, the memory 138 is non-transitory (in other words, not having any transitory signals) in that it does not embody a propagating signal. However, labeling the memory 138 as "non-transitory" should not be construed to mean that the memory 138 is incapable of movement; the memory 138 should be considered as being transportable from one physical location to another. Additionally, since the memory 138 is tangible, the memory 138 may be considered a computer-readable device.

The memory 138 is configured with one or more applications and/or modules 142-146. These modules 142-146 may include a disassembler 142, a module fingerprinter 144, and a UEFI module risk assessment 146. As is understood by skilled artisans in the relevant computer and Internet-related arts, each of the components 142-146 (e.g., a module or engine) may represent a set of executable software instructions and the corresponding hardware (e.g., memory and processor) for executing the instructions. The components 142-146 may interact with data 152 stored in memory 138, such as one or more module GUIDs 154, a UEFI Software Development Kit (SDK) 156, various report(s) 158, one or more known vendor protocol(s) 160, various module signature(s) 162, and save files 164 generated by the disassembler 142. The various components 142-146 and data 152 are discussed below.

The disassembler 142 is configured to translate the EFI byte code (EBC) of the UEFI modules 202-208 into a human-readable format, such as an assembly language. The assembly language may be any type of assembly language, such as x86 assembly, x64 assembly, or other assembly language. In one embodiment, the disassembler 142 is IDA Pro, which is available from Hex-Rays SA. In addition, the disassembler 142 may include additional modules, such as a comparator 144 and a code replacer 146, which are discussed further below. Although this disclosure references the disassembler 142 as IDA Pro, any disassembler may be used where the disassembler supports EBC and translates the EBC into a readable format.

When the disassembler 142 loads a selected UEFI firmware module, the disassembler 142 may generate a variety of files, which may be stored as disassembler save files 164. In one embodiment, where the disassembler 142 is IDA Pro, the disassembler 142 generates a database archive file from the disassembled UEFI firmware module. The database archive file contains a first file with the contents of a B-tree style database, a second file that contains flags that describe each program byte, a third file that contains index information related to named program locations, and a fourth file that contains information about local type definitions. The database archive file may be saved as a disassembler save file 164 so that it can be later manipulated or retrieved without having to examine the entirety of the selected UEFI firmware module again.

In assessing the risk that the selected UEFI firmware module represents, it is helpful to know the GUIDs referenced by the UEFI firmware module. Knowing which GUIDs are referenced can be helpful because the GUIDs identify those protocols being invoked by the selected UEFI firmware module, such as protocols that may expose or access sensitive portions of the computer system.

Using the disassembler 142, various GUIDs may be identified within the selected UEFI firmware module. The identified GUIDs may then be compared with already known module GUIDs (e.g., module GUIDs 154). As each GUID of the selected UEFI firmware module are associated with a protocol (e.g., a set of software interfaces used for communication between two binary modules), a comparison of known GUIDs with the identified GUIDs is effectively a comparison between known protocols and unknown protocols.

In addition to the known set of GUIDs 154, the disassembler 142 may use other sources in determining whether an identified GUID is known or unknown. For example, where the vendor of the selected UEFI module has provided a set of vendor protocol(s) 160, which may include an association with a GUID, the disassembler 142 may reference the vendor protocol(s) 160 to determine whether an identified GUID is a known or unknown GUID. Further still, the disassembler may reference an UEFI SDK 156, such as the UEFI Development Kit 2014, which is available from the GitHub repository accessible via the Internet, which may also include associations between protocols and GUIDs. However, where an identified GUID is not known, the disassembler 142 may record the unknown GUID in an analysis report, which may be reviewed by a moderator or other user of the UEFI firmware module analysis server 132.

Accordingly, while one aspect of the disassembler 142 is to identify unknown GUIDs, the disassembler 142 may further compile an analysis report that includes a list of GUIDs referenced by the selected UEFI firmware module. The analysis report may be stored as part of the reports 158.

In processing a selected UEFI firmware module, a moderator or user of the UEFI firmware module analysis server 132 may desire to view the assembly language version of the disassembled module to know how GUIDs are being referenced or invoked. However, the disassembler 142 may generate an assembly language version of the UEFI module with references to memory addresses and registers, and may not include references to GUIDs. Accordingly, the disassembler 142 may be modified with a code replacer 150 that replaces portions of the assembly language version of the UEFI firmware module with GUID references. The code replacer 150 may be further configured to introduce comments or to highlight instances where an unknown, but identified, GUID is being referenced. To replace or introduce GUID-related text, the code replacer 150 may track the associations between memory addresses and GUIDs and, when a given memory address is referenced, replace the referenced memory address with the associated GUID.

After the disassembly and/or analysis of a given UEFI firmware module, the UEFI firmware module analysis server 132 may generate a signature or fingerprint of the given UEFI firmware module. The signature or fingerprint of the given UEFI firmware module uniquely identifies the given UEFI firmware module such that, if the given UEFI firmware module is used in another UEFI firmware image, the UEFI firmware module analysis server 132 can quickly identify the repeat usage. The signature or fingerprint of the given UEFI firmware module may be generated by the module fingerprinter 144, which may then store the signature or fingerprint as a module signature 162. In one embodiment, the module fingerprinter 144 generates a hash value of the given UEFI firmware module, such as by using MD5 or SHA512. In an alternative embodiment, the module fingerprinter 144 may generate a fingerprint or signature based on the characteristics of the module itself, such as the developer of the module, when the module was compiled, the number of alphanumeric characters in the module, and other such characteristics.

Having generated the fingerprint or signature of the given UEFI firmware module, the UEFI firmware module analysis server 132 may assign a security risk value to the given UEFI firmware module. Accordingly, the UEFI firmware module analysis server includes a UEFI module risk assessment module 146 configured to assign the security risk value. In one embodiment, the security risk value is based on the number (e.g., an absolute value, percentage, or other such value) of known (e.g., recognized) GUIDs referenced by the given UEFI firmware module. For example, a low security risk value may be assigned to the given UEFI firmware module based on the number of known (or unknown) GUIDs being greater (or less) than a predetermined threshold, such as 50%, 60%, or 90% of referenced GUIDs. As an alternative example, a high security risk value may be assigned to the given UEFI firmware module based on the number of known (or unknown) GUIDs being less than (or greater than) a predetermined threshold, such as 20%, 30%, or 40% of referenced GUIDs. In this way, the more known GUIDs referenced by a given UEFI firmware module, the less of a security risk the UEFI firmware module may present.

Further still, a moderator or user of the UEFI firmware module analysis server 132 may modify or assign a different security risk value to the given UEFI firmware module using the UEFI module risk assessment module 146. For example, where the analysis report prepared by the UEFI firmware module analysis server 132 indicates that the given UEFI firmware module executes code that may adversely affect a computer system or references known GUIDs in an unusual way, the moderator or user may decide that the UEFI firmware module presents a higher security risk. Similarly, where a high security risk value is initially assigned to the given UEFI firmware module, a moderator or user may lower the assigned security risk value based on the analysis report, such as where the given UEFI firmware module invokes innocuous or harmless code.

Both the assigned module signatures 162 and the security risk value facilitate the risk assessment of later updated UEFI firmware or newly obtained UEFI firmware. For example, after a UEFI firmware module is extracted from a newly obtained UEFI firmware, the UEFI firmware module analysis server 132 may invoke the module fingerprinter 144 to determine a corresponding signature for the extracted UEFI firmware module. The UEFI firmware module analysis server 132 may then compare the obtained fingerprint with the module signatures 162 to determine whether such a module has been encountered before. If obtained fingerprint exists in the module signatures 162, the UEFI firmware module analysis server 132 may then assign the previously determined security risk value to the extracted UEFI firmware module.

Additionally, the disassembler 142 may include a comparator 148, which is configured to perform a differential on the extracted UEFI firmware module and another version (e.g., an older or prior version of) of the extracted UEFI firmware module. In one embodiment, the differential is performed on the basis of one or more GUID characteristics, such as the memory address where a GUID is defined, where a GUID is invoked or installed, whether a GUID is removed or uninstalled, and other such GUID characteristics. Using the comparator 148 to perform the differential on the versions of the UEFI firmware modules helps to identify differences in the newer (e.g., more recent) version of the UEFI firmware module and whether the newer UEFI firmware module presents a security risk on the basis of the GUID characteristics. The results of the differential may be stored as an analysis report and as part of the reports 158. A security risk value may be assigned to the newer UEFI firmware module based on the analysis report, such as by assigning a higher security risk value where the changes exceed a given threshold (e.g., 5% of the GUID characteristics are different).

After the UEFI firmware modules for a given UEFI firmware have been extracted, processed, and assigned a security risk value, a security risk value may be assigned to the given UEFI firmware as a whole. In one embodiment, the security risk value assigned to the UEFI firmware is a summation of the security risk values assigned to the individual modules. In another embodiment, the security risk values assigned to the UEFI firmware modules are weighted, such that certain modules (e.g., cryptographic services) are assigned a greater weight (e.g., 0.9) than other modules (e.g., graphic drivers). Thus, the security risk value assigned to the UEFI firmware may be both multiplicative and a summation. Regardless of the methodology used in obtaining the security risk value, the assigned security risk value to the UEFI firmware informs other users (e.g., system administrators) whether a given UEFI firmware presents a risk before the given UEFI firmware is deployed in a computing environment.

Figure 4:
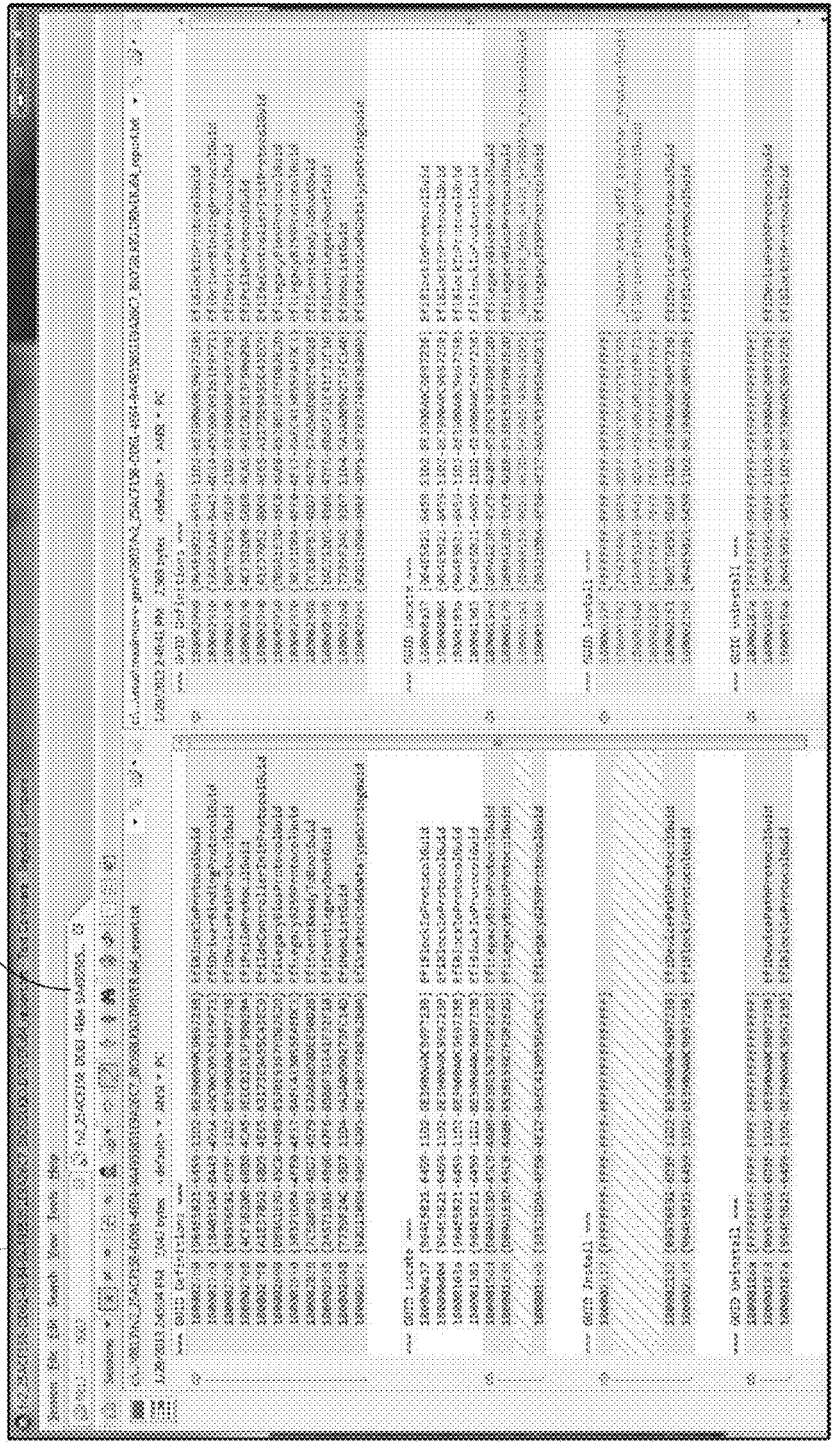
FIG. 4 illustrates a graphical user interface displaying an analysis report identifying changes in a UEFI firmware module in accordance with an example embodiment.

FIG. 4 illustrates a graphical user interface 402 displaying an analysis report 404 identifying changes in a UEFI firmware module in accordance with an example embodiment. As shown in FIG. 4, the analysis report 404 indicates that a newer version of a given UEFI firmware module (e.g., the right-hand side 406 of the analysis report 404) has had extensive changes to it compared with an older version of the UEFI firmware module (e.g., the left-hand side 408 of the analysis report 404). These changes indicate that the newer version of the UEFI firmware module has added additional GUIDs, installs additional protocols associated with these additional GUIDs, and removes previously installed protocols associated with corresponding GUIDs. Based on this comparison, the UEFI firmware module analysis server 132 and/or a moderator or user of the UEFI firmware module analysis server 132 may assign or update the security risk value associated with the UEFI firmware module shown in FIG. 4.

Figures 5A, 5B:
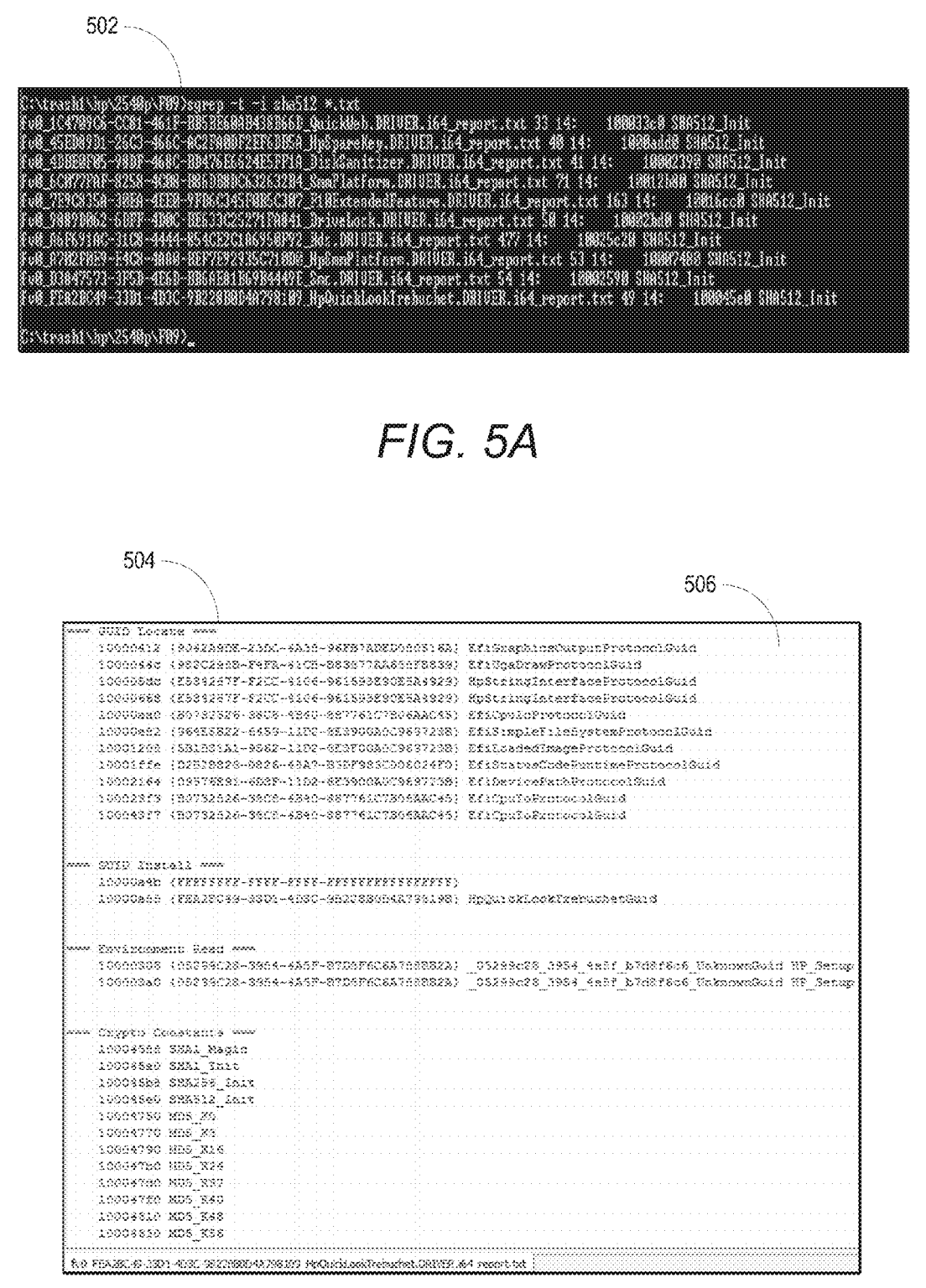

FIGS. 5A-5B illustrate user interfaces 502-504 for identifying specific portions of one or more UEFI firmware modules in accordance with an example embodiment. In FIG. 5A, a command line interface 502 has been used to search various analysis reports (e.g., reports 158) for the phrase "SHA512," which would indicate whether a given UEFI firmware module performs or references the SHA512 hashing algorithm. FIG. 5B illustrates an analysis report 506 displayed in a graphical user interface 504, where the analysis report 506 has been generated by the UEFI firmware module analysis server 132. The analysis report 506 includes the identification of various GUIDs, the installation of at least one protocol, and that the UEFI firmware module associated with the analysis report references a constant variable named "SHA512_Init." Further still, the analysis report 506 indicates that the UEFI modules includes an unknown protocol associated with an unknown GUID that performs at least two environment variable reads. As shown in FIG. 5A, having an analysis report, like the analysis report 506, is helpful to a moderator or user of the UEFI firmware module analysis server 132 because it helps the moderator or user to quickly identify UEFI firmware modules that perform specific functions, like cryptographic services, from among the UEFI firmware modules that make up a given UEFI firmware image.

Figure 6:
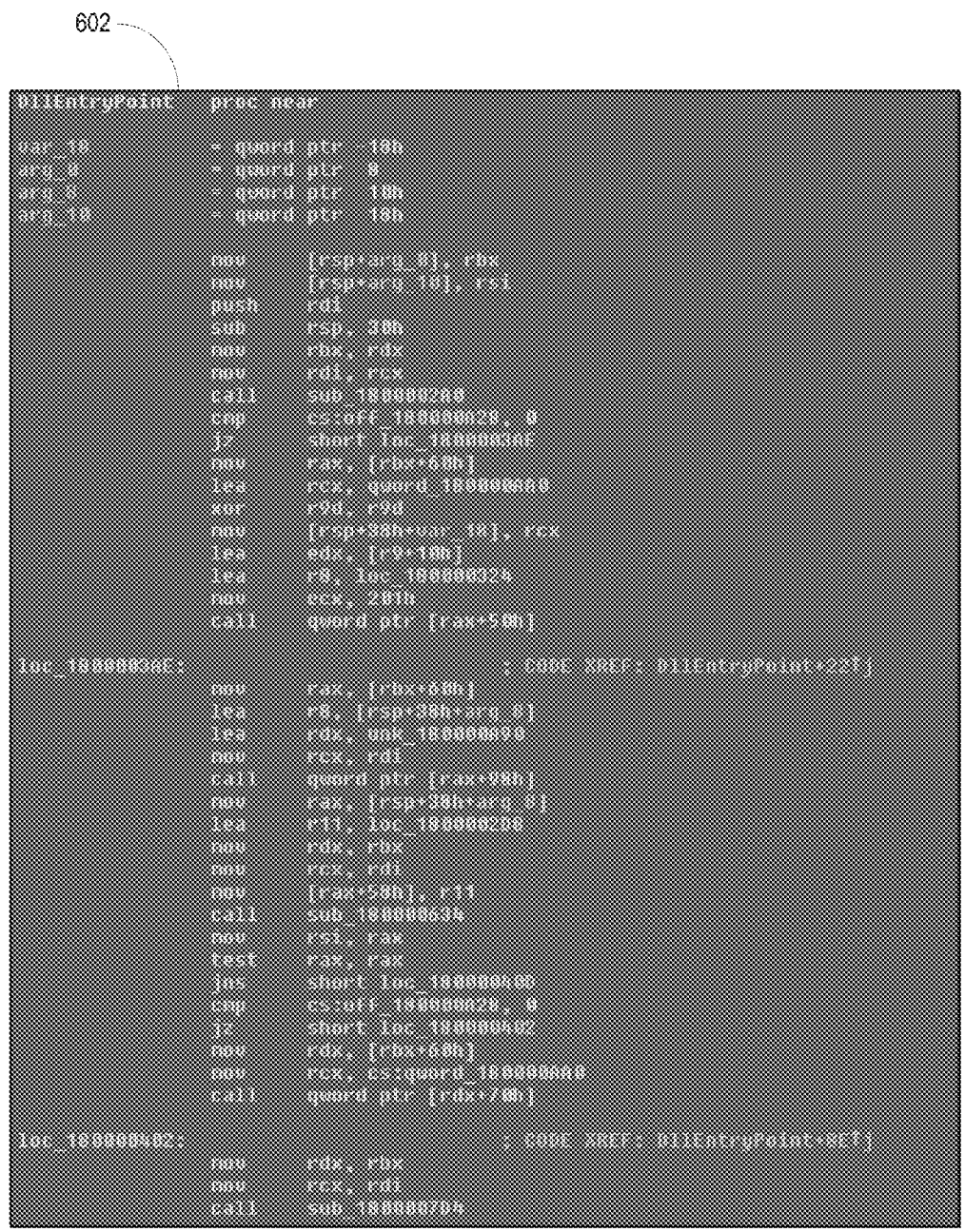
FIG. 6 illustrates a graphical user interface displaying assembly language code for a disassembled UEFI firmware module in accordance with an example embodiment.
Figure 7:
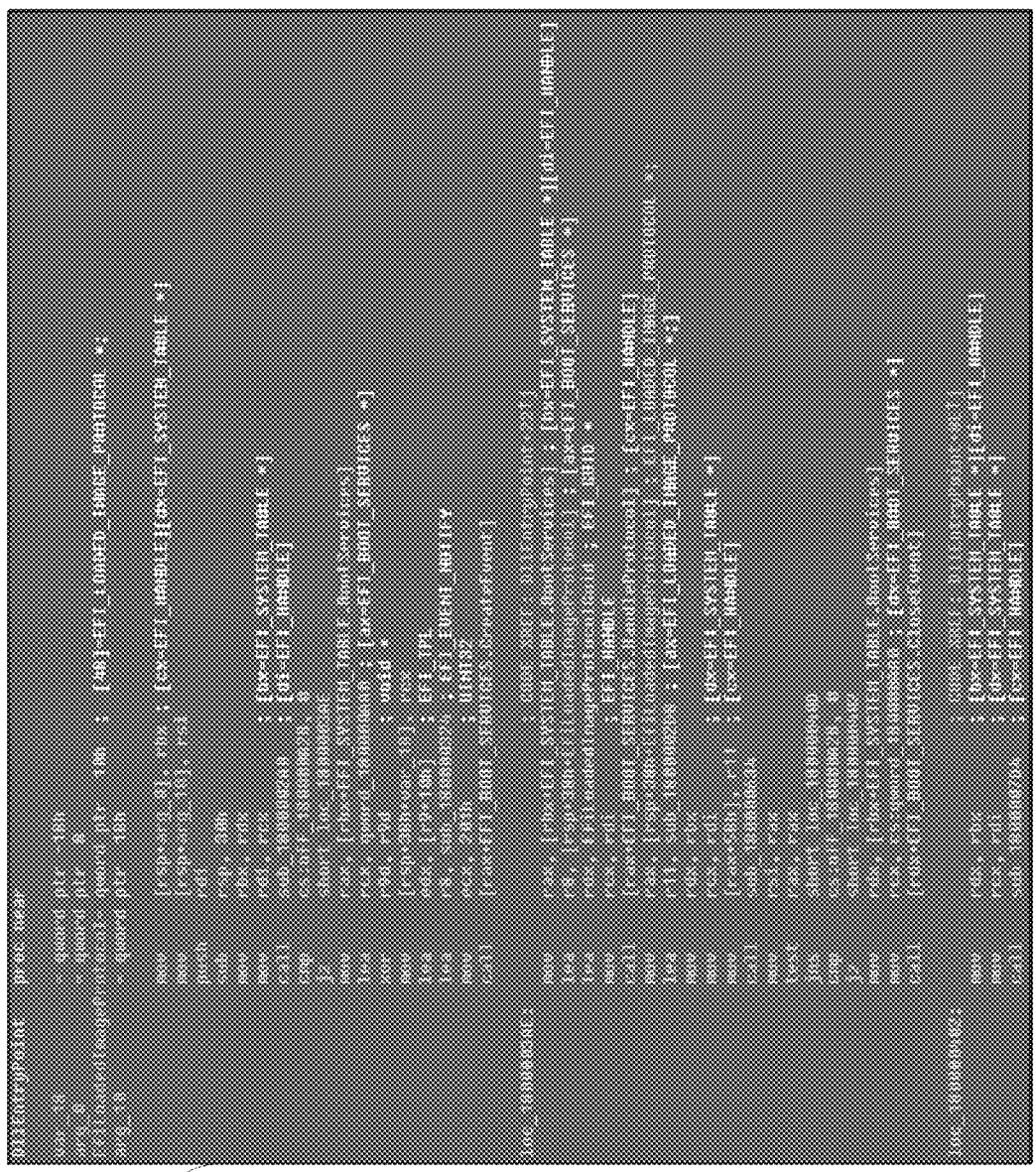
FIG. 7 illustrates another graphical user interface displaying the assembly language code of FIG. 6 with portions of the assembly language code replaced with known GUIDs in accordance with an example embodiment.
Figure 8:
FIG. 8 illustrates a further graphical user interface displaying additional assembly language code for a disassembled UEFI firmware module in accordance with an example embodiment.

FIGS. 6-8 illustrate assembly language code prepared by the disassembler 142 working in conjunction with the code replacer 150. In particular, FIG. 6 illustrates a graphical user interface 602 displaying assembly language code for a disassembled UEFI firmware module in accordance with an example embodiment. In FIG. 6, the disassembler 142 has disassembled the UEFI firmware module without the assistance of the code replacer 150. As shown in FIG. 6, the assembly language code does not contain references to any GUIDs, but references the GUIDs by way of references to specific memory addresses.

In comparison to FIG. 6, FIG. 7 illustrates another graphical user interface 702 displaying the assembly language code of FIG. 6 with portions of the assembly language code replaced with known GUIDs in accordance with an example embodiment. As discussed previously, the code replacer 150 may track memory addresses referenced in the disassembled UEFI firmware module and the various GUIDs associated with these memory addresses such that the code replacer 150 replaces references to the memory addresses with the GUID or a shortname associated with the GUID. Thus, in FIG. 7, the code replacer 150 has replaced various portions of the assembly language code with the shortname of GUIDs associated with references to various memory addresses.

FIG. 8 illustrates a further graphical user interface 802 displaying additional assembly language code for a disassembled UEFI firmware module in accordance with an example embodiment. In FIG. 8, the code replacer 150 has encountered an unknown GUID, and thus, an unknown protocol, and has replaced portions of the assembly language code with references to the unknown protocol. An example of such a reference includes the reference to "_2adb8f5b_c7d4_4e7e_be2a2363_ProtocolGuid.Data1"

and """_2adb8f5b_c7d4_4e7e_be2a2363_ProtocolGuid.Data4."
As discussed previously, the code replacer 150 may determine that the GUID is an unknown GUID by referencing the database (or repository) of known GUIDs 154.

Figure 9:
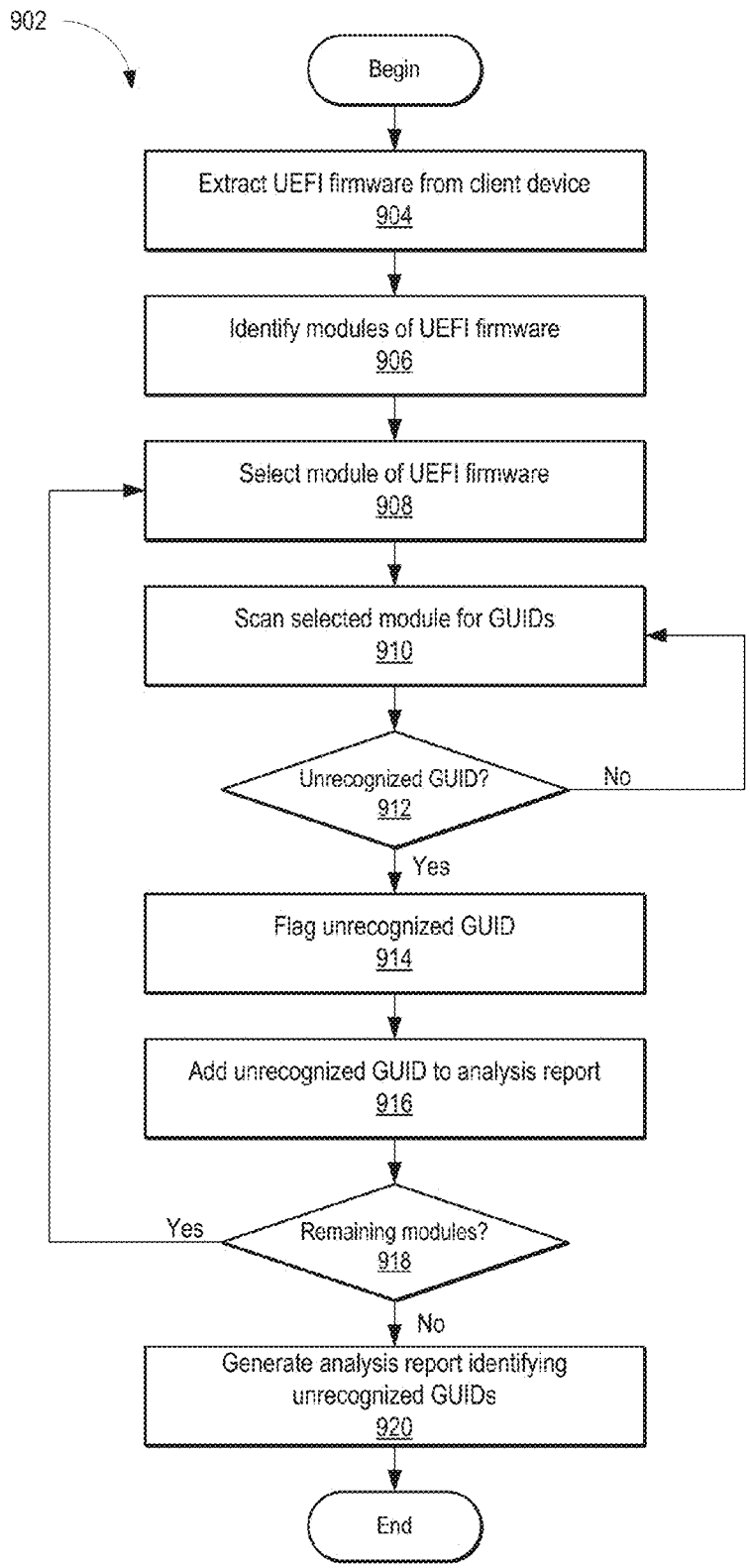
FIG. 9 illustrates a method, in accordance with an example embodiment, for identifying unknown GUIDs referenced by a UEFI firmware module.

FIG. 9 illustrates a method 902, in accordance with an example embodiment, for identifying unknown GUIDs referenced by a UEFI firmware module. The method 902 may be implemented by the UEFI firmware extraction server 104 working in conjunction with the UEFI module identification server 120 and the UEFI firmware module analysis server 132, and accordingly, is merely described by reference thereto. Initially, the UEFI firmware extraction server 104 extracts a UEFI firmware image from a client device 106 (Operation 904). Alternatively, the client device 106 may remotely execute the firmware extraction application 118 (e.g., via network 112) and may communicate the extracted firmware image to the UEFI firmware extraction server 104. The UEFI module identification server 120 may then identify the various modules of the UEFI firmware image (Operation 906). Thereafter, the UEFI firmware module analysis server 132 may select one of the modules of the UEFI firmware image for analysis, and scan the module for one or more GUIDs (Operation 910). As discussed previously, the scanning and analysis of the module may be performed by the disassembler 142. When a GUID is encountered, the GUID may be compared with previously known GUIDs (Operation 912). Sources for known GUIDs may include previously encountered GUIDs 154, a vendor protocol specification 160, an UEFI SDK 156, and other such sources or combination of sources.

Where the encountered GUID is known, the UEFI firmware module analysis server 132 may continue scanning the selected UEFI firmware module for other GUIDs. ("Yes" branch of Operation 912). Where the encountered GUID is not known ("No" branch of Operation 912), the UEFI firmware module analysis server 914 may flag the unknown GUID (Operation 914) and add the unknown (e.g., unrecognized) GUID to an analysis report (Operation 916). Alternatively or additionally, the analysis report may also include a list of all GUIDs, known and/or unknown, that the UEFI firmware module analysis server 132 encountered in its scan of the selected UEFI firmware module.

The UEFI firmware module analysis server 132 then determines whether there are other UEFI firmware modules to scan (Operation 918). If so ("Yes" branch of Operation 918), the UEFI firmware module analysis server 132 selects another UEFI firmware module and proceeds through Operations 910-916 as discussed above. If not ("No" branch of Operation 918), the UEFI firmware module analysis server 132 may then generate an analysis report identifying the unrecognized GUIDs (Operation 920). As discussed previously, this analysis report may be stored as part of the reports 158.

Figure 10:
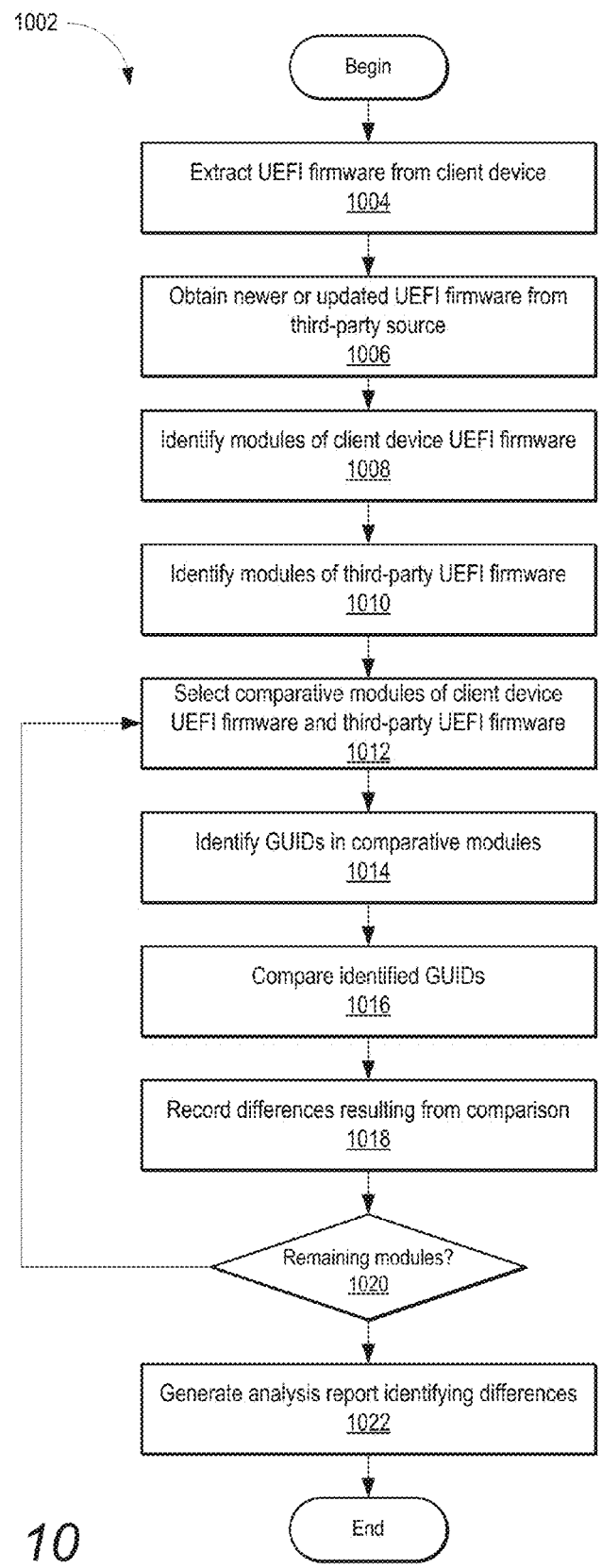
FIG. 10 illustrates a method, in accordance with an example embodiment, for comparing corresponding UEFI firmware modules and identifying the differences in the GUIDs referenced by each module.

FIG. 10 illustrates a method 1002, in accordance with an example embodiment, for comparing corresponding UEFI firmware modules and identifying the differences in the GUIDs referenced by each module. The method 1002 may be implemented by the UEFI firmware extraction server 104 working in conjunction with the UEFI module identification server 120 and the UEFI firmware module analysis server 132, and accordingly, is merely described by reference thereto. Initially, the UEFI firmware extraction server 104 extracts a UEFI firmware image from a client device 106 (Operation 1004). Alternatively, the client device 106 may remotely execute the firmware extraction application 118 (e.g., via network 112) and may communicate the extracted firmware image to the UEFI firmware extraction server 104. The UEFI firmware extraction server 104 then obtains a newer or updated version of the UEFI firmware from a third-party source (e.g., the third-party device 108) (Operation 1006). As discussed previously, the third-party source may include a motherboard manufacturer that makes available (e.g., via FTP or HTTP) various versions of an UEFI firmware.

The UEFI module identification server 120 may then identify the various modules of the UEFI firmware image extracted from the client device 106 (Operation 1008) and the various modules of the UEFI firmware image obtained from the third-party device 108 (Operation 1010). The UEFI firmware module analysis server 132 may then select one of the modules from the client-device UEFI firmware image and one of the modules from third-party device UEFI firmware image for analysis (Operation 1012). In comparing the modules for changes, the UEFI firmware module analysis server 132 may identify the various GUIDs referenced in each of the modules (Operation 1014) and compare the identified GUIDs (Operation 1016). As discussed previously with reference to FIG. 3, a comparative analysis of the corresponding modules may include comparing various characteristics associated with the GUIDs, such as the memory addresses where the GUIDs are defined, the memory addresses where the GUIDs are accessed or installed, and other such characteristics. The UEFI firmware module analysis server 132 may then record the differences of the comparison (e.g., as described with reference to FIG. 4) (Operation 1018).

The UEFI firmware module analysis server 132 may then determine whether there are other modules to compare (Operation 1020). If so ("Yes" branch of Operation 1020), UEFI firmware module analysis server 132 selects another set of corresponding UEFI firmware modules to compare. If not ("No" branch of Operation 1020), the UEFI firmware module analysis server 132 generates an analysis report identifying the differences of the various modules (Operation 1022). As discussed previously with reference to FIG. 3, the report identifying the differences between modules may be stored as part of the reports 158.

Figure 11:
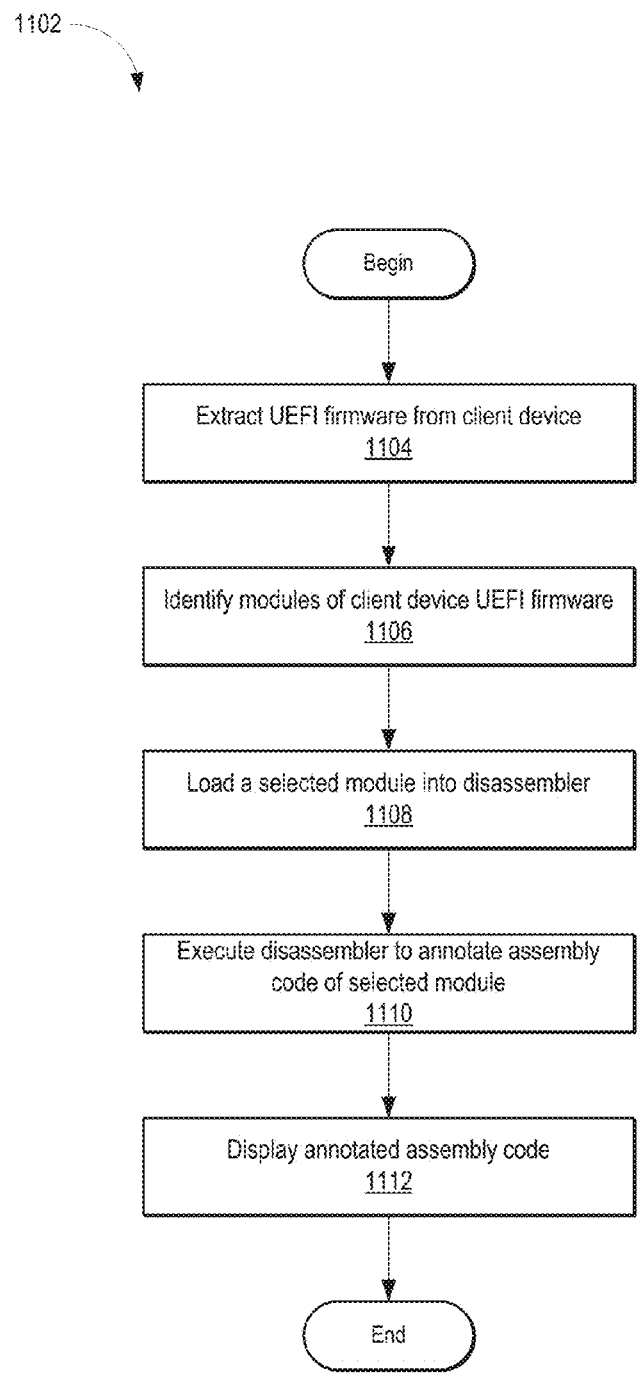
FIG. 11 illustrates a method, in accordance with an example embodiment, for disassembling a UEFI firmware module and generating annotated assembly language code.

FIG. 11 illustrates a method 1102, in accordance with an example embodiment, for disassembling a UEFI firmware module and generating annotated assembly language code. The method 1102 may be implemented by the UEFI firmware extraction server 104 working in conjunction with the UEFI module identification server 120 and the UEFI firmware module analysis server 132, and accordingly, is merely described by reference thereto. Initially, the UEFI firmware extraction server 104 extracts a UEFI firmware image from a client device 106 (Operation 1104). Alternatively, the client device 106 may remotely execute the firmware extraction application 118 (e.g., via network 112) and may communicate the extracted firmware image to the UEFI firmware extraction server 104. The UEFI module identification server 120 may then identify the various modules of the UEFI firmware image (Operation 1106). Thereafter, and with reference to FIG. 3, the UEFI firmware module analysis server 132 may select one of the modules of the UEFI firmware image for analysis, and load the module into the disassembler 142 (Operation 1108).

The UEFI firmware module analysis server 132 may then execute the disassembler 142 to translate the EBC of the selected UEFI firmware module into an assembly language (e.g., x86- or x64-assembly language) (Operation 1110). As discussed previously, the disassembler 142 may invoke a code replacer 150 to annotate one or more portions of the resulting assembly language code of the selected UEFI firmware module. The assembly language code of the selected UEFI firmware module may then be displayed (e.g., via a display communicatively coupled to the UEFI firmware module analysis server 132) (Operation 1112).

Figure 12:
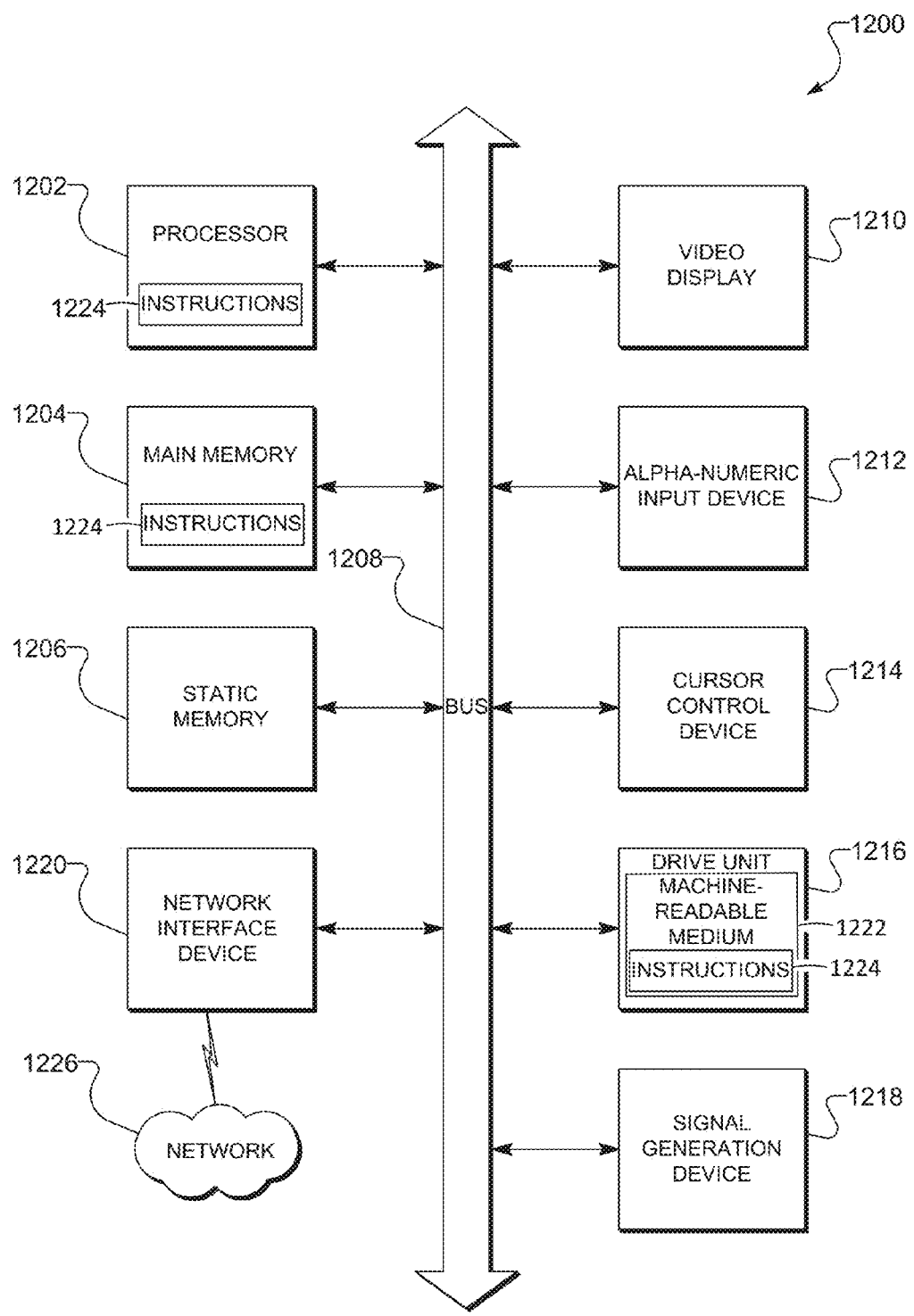
FIG. 12 is a block diagram illustrating components of a machine, according to some example embodiments, able to read instructions from a machine-readable medium and perform any one or more of the methodologies discussed herein, according to aspects of the disclosure.

FIG. 12 is a block diagram illustrating components of a machine, according to some example embodiments, able to read instructions from a machine-readable medium and perform any one or more of the methodologies discussed herein, according to aspects of the disclosure. In particular, FIG. 12 illustrates an example computer system 1200 within which instructions 1224 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

The disk drive unit 1216 includes a non-transitory machine-readable medium 1222 on which is stored one or more sets of data structures and instructions 1224 (e.g., software) embodying or utilized by any one or more of the methodologies or functions described herein. As the instructions 1224 may also reside, completely or at least partially, within the main memory 1204 and/or within the processor 1202 during execution thereof by the computer system 1200, the main memory 1204 and the processor 1202 may also constitute non-transitory, machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

In this manner, the disclosed systems and methods provide a mechanism by which the GUIDs referenced by the modules of a UEFI firmware image can be tracked and recorded. Further still, the systems and methods disclosed herein help ascertain the security risk that a different version of a given UEFI firmware may pose, which prevents the installation of malicious firmware in a computing environment. As the disclosed systems and methods assign a security risk to the individual modules of a given UEFI firmware image, the disclosed systems and methods build a repository of security risk values that can be quickly referenced when the different version of the given UEFI firmware is encountered.

Certain embodiments have been described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled.

A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. The foregoing systems and methods may include hardware (e.g., machine) and software architectures that may be deployed in various example embodiments. It is contemplated that any features of any embodiments disclosed herein can be combined with any other features of any other embodiments disclosed herein. Accordingly, these any such hybrid embodiments are within the scope of the present disclosure.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
   extracting, with one or more processors, a Universal Extensible Firmware Interface (UEFI) firmware image file from a client device configured to execute the firmware image file;
   identifying, with the one or more processors, a first plurality of modules comprising the UEFI firmware image;
   separating, with the one or more processors, the first plurality of modules into individual module files;
   disassembling, with the one or more processors, a module selected from the first plurality of module files to identify a plurality of Globally Unique Identifiers (GUIDs);
   determining, with the one or more processors, whether a GUID selected from the plurality of identified GUIDs is an unknown GUID by comparing the selected GUID with a plurality of previously identified GUIDs stored in a repository of known GUIDs in assessing a potential security risk of the module represented by the selected GUID;
   generating, with the one or more processors, an analysis report indicating whether one or more of the plurality of identified GUIDs is an unknown GUID;
   generating, with the one or more processors, a unique identifier corresponding to the module selected from the first plurality of module files; and
   assigning, with the one or more processors, a security risk value to the module selected from the first plurality of module files, wherein the security risk value is based on a number of known GUIDs referenced by the selected module.

2. The method of claim 1, further comprising:
   obtaining another UEFI firmware image file for use with the client device;
   identifying a second plurality of modules comprising the another UEFI firmware image file;
   comparing the module selected from the first plurality of modules with a corresponding module selected from the second plurality of modules; and
   identifying any differences between the module selected from the first plurality of modules and the corresponding module selected from the second plurality of modules.

3. The method of claim 2, wherein the differences comprise differences in the GUIDs referenced by the module selected from the first plurality of modules and the GUIDs referenced by the corresponding module selected from the second plurality of modules.

4. The method of claim 2, wherein the differences comprise a difference in a first memory addresses referenced by the module selected from the first plurality of modules for a given GUID and a second memory addresses referenced by the corresponding module selected from the second plurality of modules for the same GUID.

5. The method of claim 1, wherein:
   the UEFI firmware image file is assigned a security risk value based on the unique identifier corresponding to the selected module.

6. The method of claim 1, further comprising:
   obtaining another UEFI firmware image file for use with the client device;
   identifying a second plurality of modules comprising the another UEFI firmware image file, the second plurality of modules including the module selected from the first plurality of module files;
   determining that the unique identifier previously generated for the module selected from the first plurality of module files still applies to the module included in the second plurality of modules; and
   assigning a security risk value the another UEFI firmware image file based on the unique identifier.

7. The method of claim 1, further comprising:
   generating assembly language code corresponding to the module selected from the first plurality of modules; and
   replacing at least one portion of the assembly language code based on the previously identified GUIDs stored in the repository of known GUIDs.

8. A system comprising:
   a computer-readable memory storing computer-executable instructions; and
   one or more processors in communication with the computer-readable memory that, having executed the computer-executable instructions, are configured to:
      extract a Universal Extensible Firmware Interface (UEFI) firmware image the from a client device configured to execute the firmware image file;
      identify a first plurality of modules comprising the UEFI firmware image;
      separate the first plurality of modules into individual module files;
      disassemble a module selected from the first plurality of module files to Identify a plurality of Globally Unique Identifiers (GUIDs);
      determine whether a GUID selected from the plurality of identified GUIDs is an unknown GUID by comparing the selected GUID with a plurality of previously identified GUIDs stored in a repository of known GUIDs in assessing a potential security risk of the module represented by the selected GUID;

generate an analysis report indicating whether one or more of the plurality of identified GUIDs is an unknown GUID;

generate a unique identifier corresponding to the module selected from the first plurality of module files; and assign a security risk value to the module selected from the first plurality of module files, wherein the security risk value is based on a number of known GUIDs references by the selected module.

9. The system of claim 8, wherein the one or more processors are further configured to:

obtain another UEFI firmware image file for use with the client device;

identify a second plurality of modules comprising the another UEFI firmware image file;

compare the module selected from the first plurality of modules with a corresponding module selected from the second plurality of modules; and identify any differences between the module selected from the first plurality of modules and the corresponding module selected from the second plurality of modules.

10. The system of claim 9, wherein the differences comprise differences in the GUIDs referenced by the module selected from the first plurality of modules and the GUIDs referenced by the corresponding module selected from the second plurality of modules.

11. The system of claim 9, wherein the differences comprise a difference in a first memory addresses referenced by the module selected from the first plurality of modules for a given GUID and a second memory addresses referenced by the corresponding module selected from the second plurality of modules for the same GUID.

12. The system of claim 8, wherein:

the UEFI firmware image file is assigned a security risk value based on the unique identifier corresponding to the selected module.

13. The system of claim 8, wherein the one or more processors are further configured to:

obtain another UEFI firmware image file for use with the client device;

identify a second plurality of modules comprising the another UEFI firmware image file, the second plurality of modules including the module selected from the first plurality of module files;

determine that the unique identifier previously generated for the module selected from the first plurality of module files still applies to the module included in the second plurality of modules; and assign a security risk value to the another UEFI firmware image file based on the unique identifier.

14. The system of claim 8, wherein the one or more processors are further configured to:

generate assembly language code corresponding to the module selected from the first plurality of modules; and replace at least one portion of the assembly language code based on the previously identified GUIDs stored in the repository of known GUIDs.

15. A non-transitory, computer-readable medium storing computer-executable instructions that, when executed by one or more processors, cause the one or more processors to perform a method, the method comprising:

extracting, with one or more processors, a Universal Extensible Firmware Interface (UEFI) firmware image the from a client device configured to execute the firmware image file;

identifying, with the one or more processors, a first plurality of modules comprising the UEFI firmware image;

separating, with the one or more processors, the first plurality of modules into individual module files;

disassembling, with the one or more processors, a module selected from the first plurality of module files to identify a plurality of Globally Unique Identifiers (GUIDs);

determining, with the one or more processors, whether a GUID selected from the plurality of identified GUIDs is an unknown GUID by comparing the selected GUID with a plurality of previously identified GUIDs stored in a repository of known GUIDs in assessing a potential security risk of the module represented by the selected GUID;

generating, with the one or more processors, an analysis report indicating whether one or more of the plurality of identified GUIDs is an unknown GUID;

generating, with the one or more processors, a unique identifier corresponding to the module selected from the first plurality of module files; and assigning, with the one or more processors, a security risk value to the module selected from the first plurality of module files, wherein the security risk value is based on a number of known GUIDs referenced by the selected module.

16. The non-transitory, computer-readable medium of claim 15, wherein the method further comprises:

obtaining another UEFI firmware image file for use with the client device;

identifying a second plurality of modules comprising the another UEFI firmware image file;

comparing the module selected from the first plurality of modules with a corresponding module selected from the second plurality of modules; and identifying any differences between the module selected from the first plurality of modules and the corresponding module selected from the second plurality of modules.

17. The non-transitory, computer-readable medium of claim 16, wherein the differences comprise differences in the GUIDs referenced by the module selected from the first plurality of modules and the GUIDs referenced by the corresponding module selected from the second plurality of modules.

18. The non-transitory, computer-readable medium of claim 16, wherein the differences comprise a difference in a first memory addresses referenced by the module selected from the first plurality of modules for a given GUM and a second memory addresses referenced by the corresponding module selected from the second plurality of modules for the same GUID.

19. The non-transitory, computer-readable medium of claim 15:

the UEFI firmware image file is assigned a security risk value based on the unique identifier corresponding to the selected module.

20. The non-transitory, computer-readable medium of claim 15, wherein the method further comprises:

obtaining another UEFI firmware image file for use with the client device;

identifying a second plurality of modules comprising the another UEFI firmware image file, the second plurality of modules including the module selected from the first plurality of module files;
determining that the unique identifier previously generated for the module selected from the first plurality of module files still applies to the module included in the second plurality of modules; and
assigning a security risk value to the another UEFI firmware image file based on the unique identifier.

* * * * *

UNITED STATES PATENT AND TRADEMARK OFFICE
CERTIFICATE OF CORRECTION

PATENT NO. : 9,842,210 B2  
APPLICATION NO. : 14/598740  
DATED : December 12, 2017  
INVENTOR(S) : Robert Allen Rose Page 1 of 1

It is certified that error appears in the above-identified patent and that said Letters Patent is hereby corrected as shown below:

On the Title Page

In item (65), in "Prior Publication Data", in Column 1, Line 1, after "2015", insert --¶Related U.S. Application Data
(60) Provisional application No. 61/928,125, filed on Jan. 16, 2014.--

In the Specification

In Column 9, Line 38, delete "214" and insert --124-- therefor

In Column 11, Line 6, delete "144" and insert --148-- therefor

In Column 11, Line 6, delete "146," and insert --150,-- therefor

In Column 15, Line 37, delete "914" and insert --132-- therefor

In the Claims

In Column 22, Line 40, in Claim 6, after "value", insert --to--

In Column 22, Line 55, in Claim 8, delete "the" and insert --file-- therefor

In Column 22, Line 62, in Claim 8, delete "Identify" and insert --identify-- therefor In Column 23, Line 12, in Claim 8, delete "references" and insert --referenced-- therefor In Column 24, Line 3, in Claim 15, delete "the" 1st occurrence and insert --file-- therefor In Column 24, Line 55, in Claim 18, delete "GUM" and insert --GUID-- therefor Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*